United States Patent
Lee et al.

(10) Patent No.: US 7,315,315 B2
(45) Date of Patent: Jan. 1, 2008

(54) HALFTONE PROCESSING METHOD IN LASER PRINTER AND APPARATUS USING THE SAME

(75) Inventors: Beom-ro Lee, Suwon-si (KR); Je-man Seo, Suwon-si (KR); Myong-hun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 11/131,213

(22) Filed: May 18, 2005

(65) Prior Publication Data

US 2006/0012661 A1 Jan. 19, 2006

(30) Foreign Application Priority Data

Jul. 14, 2004 (KR) ...................... 10-2004-0054703

(51) Int. Cl.
*B41J 2/52* (2006.01)
(52) U.S. Cl. ...................... 347/131; 347/240; 347/254; 358/3.06
(58) Field of Classification Search ................. 347/131, 347/240, 254
See application file for complete search history.

(56) References Cited

U.S. PATENT DOCUMENTS 6,111,593 A 8/2000 Henderson et al. .......... 347/115
6,538,677 B1 3/2003 Thompson et al. .......... 347/131
7,253,829 B2 * 8/2007 Gahang et al. .............. 347/252

FOREIGN PATENT DOCUMENTS

| JP | 06-167866 | 6/1994 |
|---|---|---|
| JP | 2002-033914 | 1/2002 |
| JP | 2003-219169 | 7/2003 |
| KR | 10-2000-0050344 A | 8/2000 |
| KR | 10-2000-0056599 | 9/2000 |
| KR | 10-2001-0038696 | 5/2001 |
| KR | 10-2003-0013666 | 2/2003 |

* cited by examiner

*Primary Examiner*—Huan Tran
(74) *Attorney, Agent, or Firm*—Roylance, Abrams, Berdo & Goodman, LLP

(57) ABSTRACT

A halftone processing method for correcting the variation in light intensity on a photoconductive drum and an apparatus using the same, wherein the method includes the steps of preparing a plurality of dithering functions, detecting the position where image data for forming an electrostatic latent image is scanned on the photoconductive drum, selecting one of the plurality of dithering functions according to the detected scanning position, and halftone-processing the image data using the selected dithering function. Accordingly, the halftone processing method improves print quality by increasing light intensity at the edges of a photoconductive drum by permitting the laser printer to be halftone-processed using dithering functions whose critical values are different for the center and the edges of the photoconductive drum.

10 Claims, 7 Drawing Sheets

| 1 | 9 | 4 | 12 |
|---|---|---|---|
| 13 | 5 | 16 | 8 |
| 3 | 11 | 2 | 10 |
| 15 | 7 | 14 | 6 |

| 1  | 9  | 4  | 12 |
|----|----|----|----|
| 13 | 5  | 16 | 8  |
| 3  | 11 | 2  | 10 |
| 15 | 7  | 14 | 6  |

902

| 2  | 10 | 5  | 13 |
|----|----|----|----|
| 13 | 6  | 16 | 9  |
| 4  | 12 | 3  | 11 |
| 16 | 8  | 15 | 7  |

904

| 16 | 12 | 8  | 13 |
|----|----|----|----|
| 7  | 3  | 4  | 9  |
| 11 | 2  | 1  | 5  |
| 15 | 6  | 10 | 14 |

906

| 16 | 13 | 9  | 14 |
|----|----|----|----|
| 8  | 4  | 5  | 10 |
| 12 | 3  | 2  | 6  |
| 16 | 7  | 11 | 15 |

908

HALFTONE PROCESSING METHOD IN LASER PRINTER AND APPARATUS USING THE SAME

CROSS-REFERENCE TO RELATED APPLICATIONS

This application claims the benefit under 35 U.S.C. 119(a) of Korean Patent Application No. 10-2004-0054703, filed in the Korean Intellectual Property Office on Jul. 14, 2004, the entire disclosure of which is hereby incorporated by reference.

BACKGROUND OF THE INVENTION

1. Field of the Invention

The present invention relates to a laser printer. More particularly, the present invention relates to a halftone processing method for improving print quality by correcting the variation in light intensity on a photoconductive drum, and an apparatus using the same.

2. Description of the Related Art

Printers are currently the most popular device for producing the results from a personal computer (PC) into hard copies for verifying, maintaining and transmitting, and are a fundamental component of multi-function printers, facsimiles, electronic cash registers, and automatic teller machines (ATMs).

Modern ink jet printers and laser printers have replaced earlier daisy wheel printers, dot matrix printers and line printers to become two of the most popular types of printers.

A laser printer uses physical elements such as toner, a light beam (as provided by a laser or LED array), electrostatic attraction, heat, and pressure to produce desired results. The core technique of the laser printing method is electrostatic attraction.

FIG. 1 is a schematic structural diagram of a conventional laser printer. Referring to FIG. 1, the laser printer includes a printing unit 100, which prints an image onto a paper S, an output path 240, a reversal path 250, a paper feed cassette 200, a pickup roller 201, and a feed roller 210.

The printing unit 100 includes a charger 120, a laser scanning unit (LSU) 130, a photoconductive drum 110, developers 140 filled with developing agents, a transfer belt 150, a transfer roller 160, and a fixing unit 170. The printing unit 100 prints an image onto a paper S using electrophotography. The printing unit 100 can print a color image and thus, includes four developers 140 that are filled with developing agents for black (K), cyan (C), magenta (M), and yellow (Y) respectively.

A procedure of forming an image using the printing unit 100 will now be briefly described. First, the charger 120 supplies an electric charge to the photoconductive drum 110 to thereby charge the photoconductive drum 110. Next, an exposure is performed to form an electrostatic latent image on the photoconductive drum 110. If the LSU 130 scans light which corresponds to information regarding a yellow color for example, onto the photoconductive drum 110, a yellow electrostatic latent image is formed due to the differences in electric potential between portions where light was scanned and other portions. Next, the developer 140 supplies developing agent to the electrostatic latent image to develop the electrostatic latent image and form a yellow toner image. The toner image is then transferred to the transfer belt 150.

After the transfer of the yellow toner image to the transfer belt 150, magenta, cyan, and black toner images are sequentially transferred to the transfer belt 150 using the same method as described above, superimposing these toner images with the yellow toner image. As a result, a color toner image is formed on the transfer belt 150. The color toner image is then transferred onto paper S passing between the transfer belt 150 and the transfer roller 160, and heat and pressure are applied to the paper to fix the color toner image onto the paper. Accordingly, a color image is obtained.

FIG. 2 is a detailed structural diagram of the LSU 130 of FIG. 1. The LSU 130 forms an electrostatic latent image by scanning an optical signal, such as a laser beam, over a photoconductive medium, such as a photoconductive drum 310.

Referring to FIG. 2, the LSU 130 includes a light source 307, a rotating polygon mirror 309 driven by a motor (not shown) for reflecting a laser beam emitted from the light source 307, an f-θ lens 315 for focusing the laser beam reflected by the rotary polygon mirror 309 onto the surface of the photoconductive drum 310 to form a spot with an appropriate diameter along a scanning line 318, and a reflecting mirror 320 located along an optical path between the f-θ lens 315 and the photoconductive drum 310 to reflect an incident beam so that the laser beam passing through the f-θ lens 315 is directed toward the photoconductive drum 310. An electrostatic latent image is formed on the photoconductive drum 310 by switching the light source 307 on and off.

A collimating lens 322 is provided for converting an incident beam into a parallel beam, and a cylindrical lens 335 is provided for converging the parallel beam onto a reflective surface of the rotary polygon mirror 309, and are both located along the optical path between the light source 307 and the rotary polygon mirror 309. A laser beam detector 325 is further provided and equipped to detect the position where the scanning line 318 starts.

Here, the laser beam emitted from the light source 307 is converted into the parallel beam by the collimating lens 322, and the parallel beam passes through the cylindrical lens 335 and is reflected by the rotary polygon mirror 309. The beam reflected by the rotary polygon mirror 309 passes through the f-θ lens 315, and the reflecting mirror 320 changes the optical path of the beam so that the beam is focused on the photoconductive drum 310 to form the spot at a point along the scanning line 318 of the photoconductive drum 310.

In a laser printer, a phenomenon can occur wherein the resolution is inferior at the edges of the paper than in the center, since the intensity of the laser beam is lower at the edges of the photoconductive drum 310 than in the center.

Referring to FIG. 3, the incident angle of a laser beam being incident to the rotary polygon mirror 309 varies according to the rotation of the rotary polygon mirror 309. In general, the reflection rate of the rotary polygon mirror 309 is best when the incident angle is 45° and gradually decreases as the incident angle is deviated from the angle of 45°. Accordingly, the intensity of the laser beam is the strongest at the center of the photoconductive drum 310 and weakens towards the edges.

The reflection ratio of the f-θ lens 315 also affects the variation of the light intensity on the photoconductive drum 310, since the reflection rate of the edges of the f-θ lens 315 is inferior to that at the center.

FIG. 3 is a graph obtained by measuring the intensity of receiving beams on the photoconductive drum 310. In FIG. 3, the horizontal axis indicates the distance from the center of the photoconductive drum 310, and the vertical axis indicates the intensity of beams received at the corresponding positions. Individual plots of the graph indicate the intensity of beams measured with respect to different LSUs

2, #3, #4 and #5, respectively. As shown in FIG. 3, the intensity of the beams is strongest at the center of the photoconductive drum 310 and weaker towards the edges. Specifically, the intensity of the beams is detected at a value of 0.3 mW at the center of the photoconductive drum 310, and at a value of 0.255 mW to 0.272 mW at the edges. The plots of the graph shown in FIG. 3 are obtained by measuring the intensity of a receiving beam on the photoconductive drum 310 using an optical power meter.

The variation in the intensity of the beams on the photoconductive drum 310 causes uneven printing quality or resolution deterioration at the edges of the paper.

Accordingly, a need exists for a system and method for correcting the variation in the intensity of a beam generated on a photoconductive drum.

SUMMARY OF THE INVENTION

The present invention provides a halftone processing method for improving printing quality by correcting the variation in the intensity of a beam generated on a photoconductive drum in a laser printer.

The present invention also provides a halftone processing apparatus suitable for using the halftone processing method for improving printing quality.

According to an aspect of the present invention, a halftone processing method is provided for improving printing quality by correcting the variation in the intensity of a beam generated on a photoconductive drum in a laser printer, the method comprising the steps of preparing a plurality of dithering functions, detecting a position where image data for forming an electrostatic latent image is scanned on the photoconductive drum, selecting one of the plurality of dithering functions according to the detected scanning position, and halftone-processing the image data using the selected dithering function.

According to another aspect of the present invention, a halftone processing apparatus is provided for correcting the variation in the intensity of a beam generated on a photoconductive drum in a laser printer, the apparatus comprising a dithering function memory in which a plurality of dithering functions are stored, and a image data processing unit for selecting one of the plurality of dithering functions stored in the dithering function memory according to a position where image data for forming an electrostatic latent image is scanned on the photoconductive drum, and for performing a halftone process for image data to be printed from the laser printer using the selected dithering function.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

Hereinafter, the present invention will now be described more fully with reference to the accompanying drawings, in which a number of exemplary embodiments of the present invention are shown.

An apparatus for correcting the variation in the intensity of a beam according to an embodiment of the present invention substantially solves the problems associated with the conventional devices by correcting the variation in the intensity of a beam on a photoconductive drum of a laser printer.

Specifically, the apparatus according to an embodiment of the present invention corrects the variation in the intensity of a beam on the edges of the photoconductive drum by performing different halftone processes on the center and the edges of the photoconductive drum. Here, critical values of the dithering functions on the center and the edges of the photoconductive drum are different.

Figure 1:
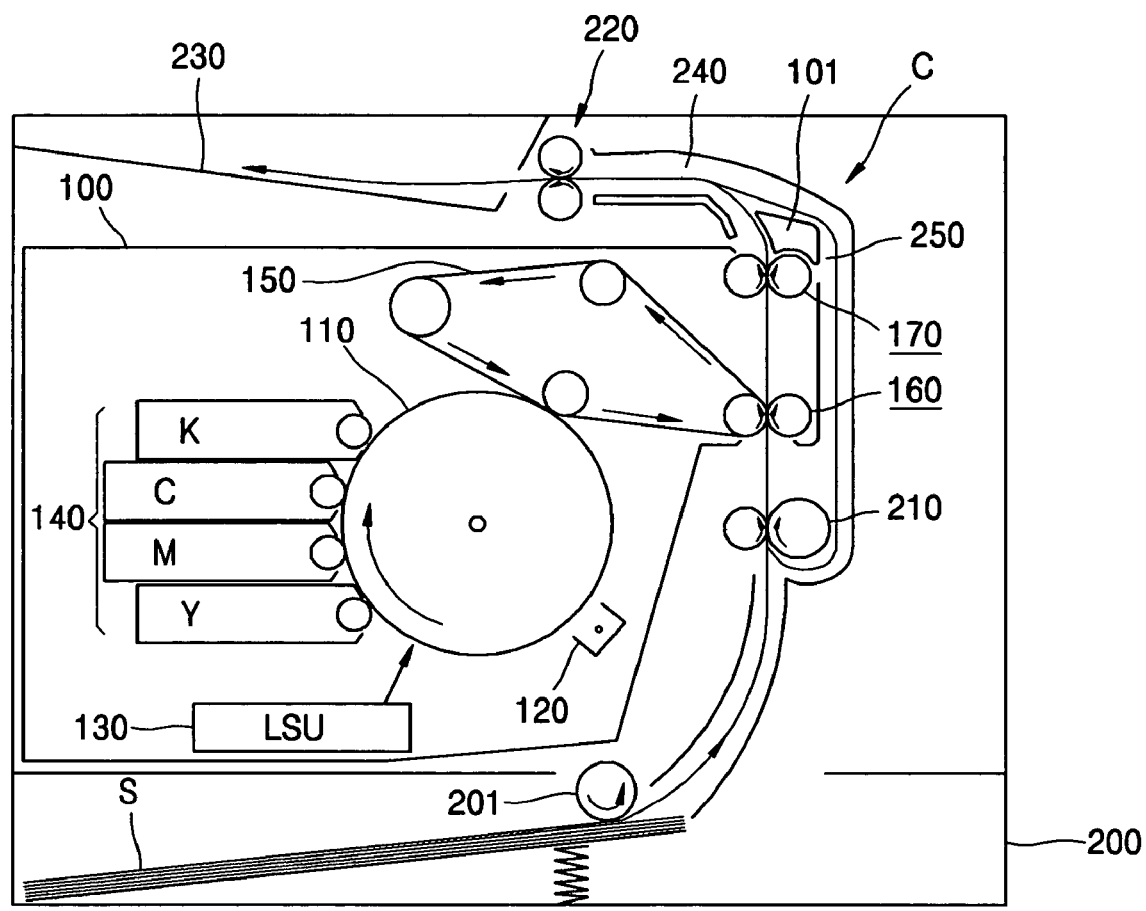
FIG. 1 is a schematic structural diagram of a conventional laser printer.
Figure 2:
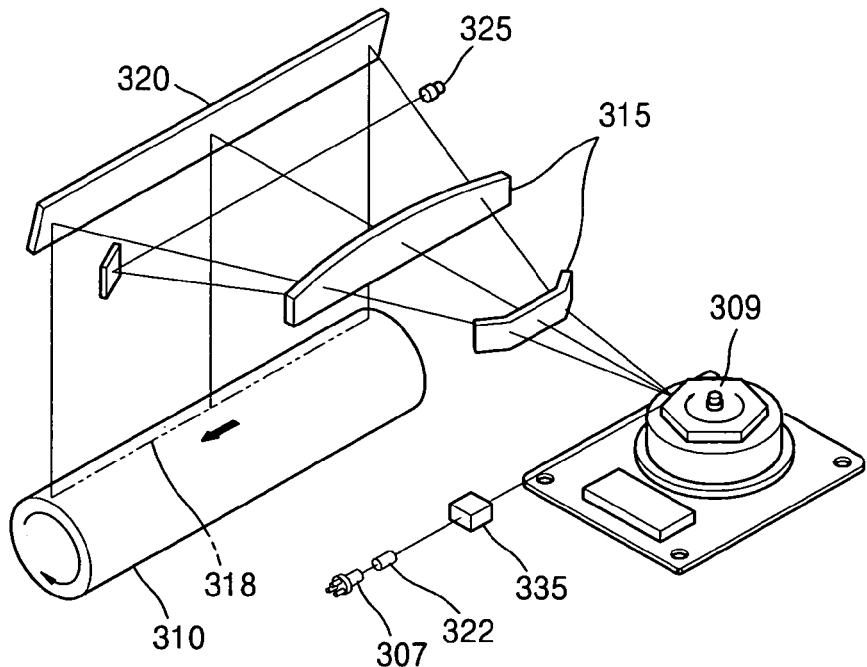
FIG. 2 is a detailed structural diagram of an LSU of FIG. 1.
Figure 3:
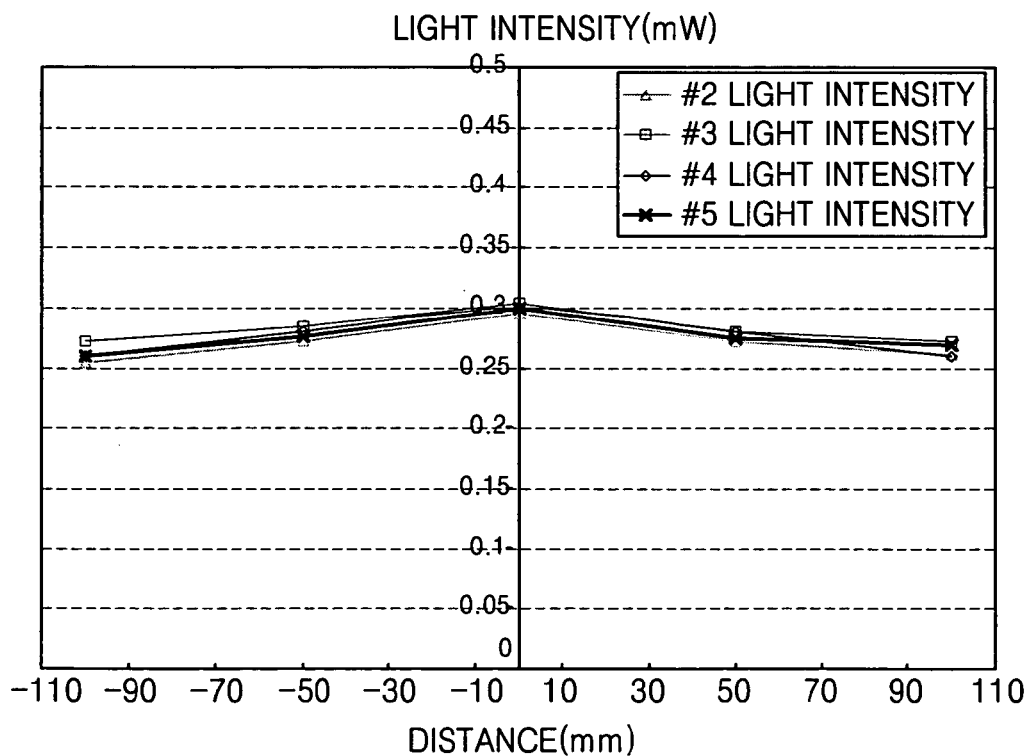
FIG. 3 is a graph obtained by measuring the intensity of receiving beams on a photoconductive drum.
Figure 4:
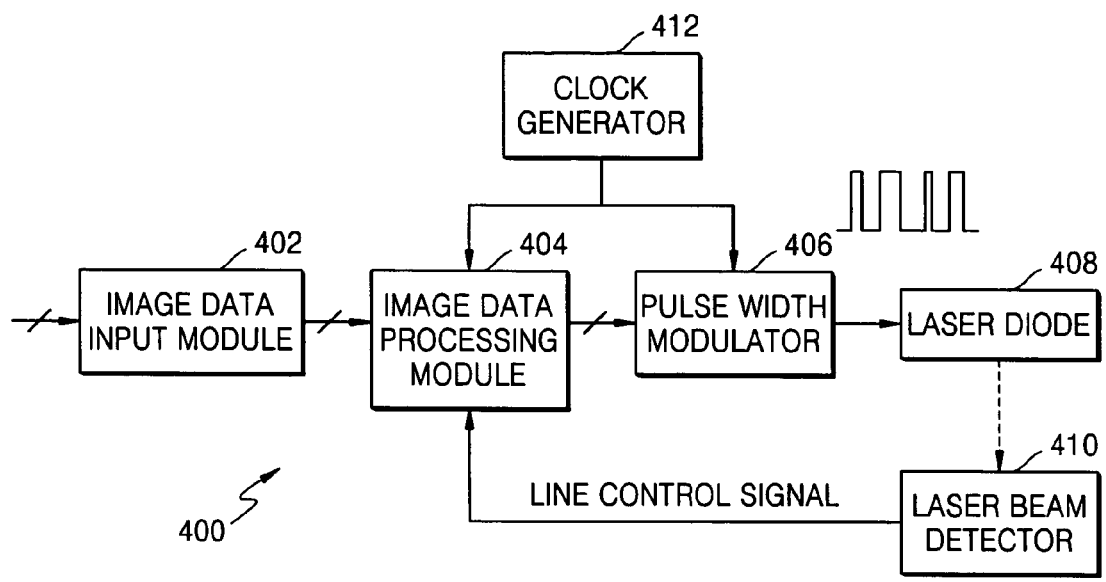
FIG. 4 is a block diagram of a circuit of a conventional laser printer.

FIG. 4 is a block diagram of a circuit of a conventional laser printer 400. Referring to FIG. 4, the laser printer 400 includes an image data input module 402, an image data processing module 404, a pulse width modulator 406, a laser diode 408, a laser beam detector 410, and a clock generator 412.

The image data input module 402 inputs image data to be printed from the laser printer 400. The image data processing module 404 converts the image data output from the image data input module 402 into image data of a CMY color space processed by the laser printer 400, and performs a halftone process on the image data to satisfy gradient reproducibility of the laser printer 400.

The CMYK color signals output from the image data processing module 404 are sequentially provided to the laser diode 408 of an LSU (not shown) after passing through the pulse width modulator 406.

A laser beam output from the laser diode 408 forms an electrostatic latent image on a photoconductive drum 310. Here, the operation of the image data processing module 404 is synchronized with the laser beam detector 410

Figures 5, 6:
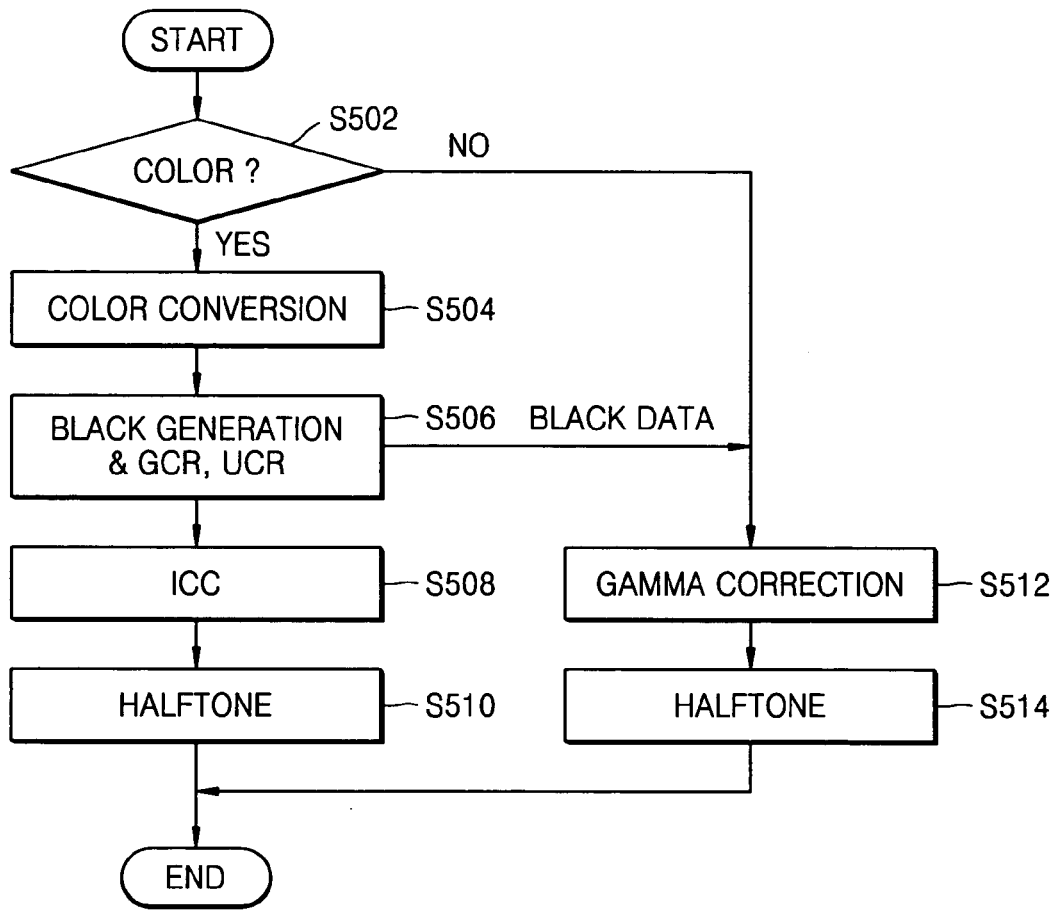
FIG. 5 is a flowchart of an image data processing method to which a conventional halftone processing method is applied.
FIG. 6 is an example of the dithering functions used in the conventional halftone processing method illustrated in FIG. 5.

FIG. 5 illustrates a flowchart of an image data processing method to which a conventional halftone processing method is applied.

In the method of FIG. 5, it is first determined whether input image data is color image data in operation S502. If the input image data is not color image data, a mono image data processing operation comprised of operations S512 and S514 is performed.

If the input image data is color image data, a color video processing operation comprised of operations S504 through S510 is performed.

The color image data is color-converted in operation S504. That is, the color image data of an RGB color space is converted into color image data of the CMY color space to be processed by a laser printer. Here, C indicates cyan, M indicates magenta, Y indicates yellow, and K indicates black.

In operation S506, gray component reduction (GCR) and under color removal (UCR) is performed on the converted color image data of the CMY color space, and a black video signal K, which is a gray component, is extracted. The GCR is one of the methods used when an RGB color image is converted into a CMYK color image. A black color in the CMYK color image is substituted for a color of a region to be printed with a gray color in the RGB color image using the GCR. That is, a portion where RGB values in the RGB color space of an image are the same, is substituted with the black color in the CMY color space of the image. Such a substitution is preferred since the black color produces better in a printing result than the gray color.

The UCR is another one of the methods used when an RGB color image is converted into a CMYK color image. A CMYK component of a portion printed with a dark color is removed to reduce the amount of ink using the UCR. The UCR is used to reduce the amount of ink used, rather than to change the color of the image.

The black image data (that is, a K signal) extracted in operation S506 is processed into the mono image data processing operation that is comprised of operations S512 and S514.

A color matching process is then performed on the other color image data (that is, the C, M and Y signals) in operation S508. In general, the color matching is performed using an ICC profile. The ICC profile was enacted by an international organization called the International Color Consortium (ICC) to standardize the processing of colors between different digital devices. Monitors, scanners and printers can all represent different ranges of colors, which may not coincide with one another. For example, printers may not represent colors that monitors can represent, and colors that can be represented by scanners or digital cameras may not be represented on some monitors or printers. This color representation range means that some colors shown on a monitor may not be capable of being normally output by a printer. The ICC profile solves this basic color range problem. The ICC profile indicates color conversion information between a standard color space and a device. If a photo image is read using a scanner or a digital camera on the basis of the ICC profile, color abnormality or loss of color information can be largely prevented.

After the color matching process is performed, the color image data (that is, the C, M and Y signals) is halftone-processed with screening and dithering in operation S510, and is output to the pulse width modulator 406 shown in FIG. 4.

The screening converts a composition angle of a CMY component used in screen printing. The dithering converts high gradient image data into low gradient image data that can be processed by the printer. Since the gradient reproducibility of a printer is lower than that of image data, the gradient of the image data is lowered using dithering.

The halftone processing operation S510 is actually performed by making the angles of the dithering functions applied to the CMY signals different from each other.

In the mono image data processing operation, gamma correction is performed to correct linearity on the black image data K in operation S512, and the black image data K is halftone-processed with screening and dithering in operation S514, similar to the color image data processing operation S510, and is then output to the pulse width modulator 406 shown in FIG. 4.

The pulse width modulator 406 sequentially outputs CMYK signals to the laser diode 408 of the LSU by synchronizing the CMYK signals with a line control signal output from the laser beam detector 410.

FIG. 6 is an example of the dithering functions used in the conventional halftone processing method illustrated in FIG. 5. A 4×4 dithering function is shown in FIG. 6. In the dithering function, each lattice corresponds to a pixel position, and each lattice value indicates a masking value of a corresponding pixel. For example, a value "1" of the top left position of the dithering function shown in FIG. 6, is a masking value of a pixel of a corresponding position. The value "1" means that the pixel of the corresponding position is printed with a corresponding color (for example, the black color) only when the value of the pixel of the corresponding position is larger than or equal to 1. When the gradient reproducibility of the dithering function is 16 (that is, $2^4$) as shown in FIG. 6, actually the most significant four bits of image data are compared with the masking value. For example, even if the image data is represented with 10 bits, the halftone process is performed using the most significant four bits according to the gradient reproducibility of 16 of the dithering function.

The dithering function shown in FIG. 6 has values of 1 through 16. The lowest value "1" is called a critical value.

In the halftone processing operation S510, the screening and halftone processes are actually simultaneously performed by making the angles of the dithering functions applied to the color image data (that is, CMY signals) different from each other, that is, by applying the dithering functions (or masks) shown in FIG. 6 to the color image data with predetermined angles corresponding to various colors.

In the conventional halftone processing method, the same dithering functions are used for the edges and the center of the photoconductive drum 310 as shown in FIG. 6.

In the embodiments of the present invention, the strength of a laser beam is increased at the edges of a photoconductive drum by applying different dithering functions to the edges and the center of the photoconductive drum when a halftone process for gradient conversion on the image data is performed. That is, the variation in light intensity on the photoconductive drum is corrected by increasing the strength of the laser beam at the edges of the photoconductive drum.

Figure 7:
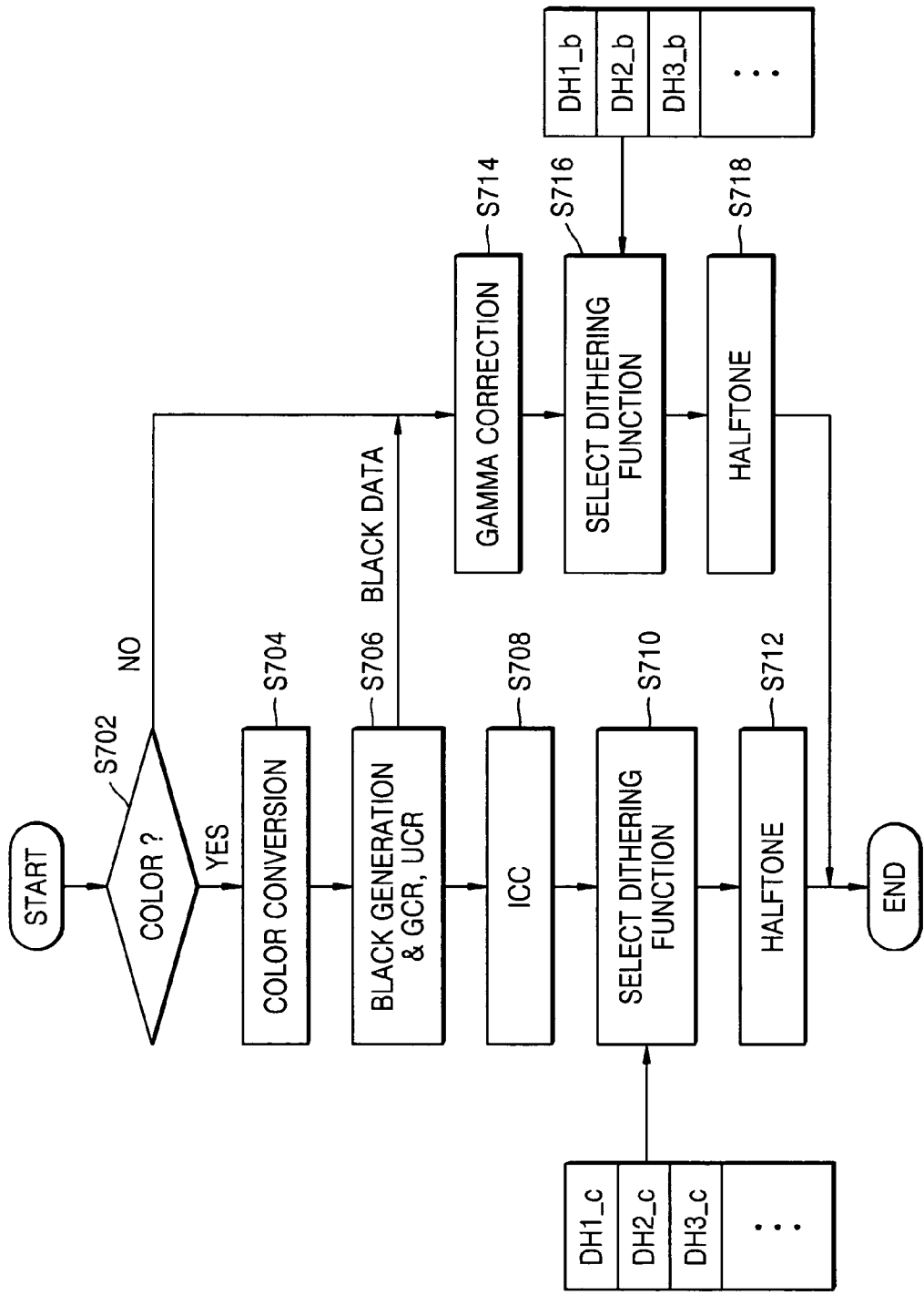
FIG. 7 is a flowchart of an image data processing method to which a halftone processing method according to an embodiment of the present invention is applied.

FIG. 7 illustrates a flowchart of an image data processing method to which a halftone processing method according to an embodiment of the present invention is applied.

In the method of FIG. 7, it is first determined whether input image data is color image data in operation S702. If the input image data is not color image data, a mono image data processing operation comprised of operations S714 through S718 is performed.

If the input image data is color image data, a color video processing operation comprised of operations S704 through S712 is performed.

The color image data is color-converted in operation S704. That is, the color image data of the RGB color space is converted into color image data of the CMY color space to be processed by a laser printer.

In operation S706, the GCR and UCR processes are performed on the converted color image data of the CMY color space, and a black video signal K, which is a gray component, is extracted.

The black image data (that is, the K signal), which is the gray component extracted from among the converted CMYK image data of the CMY color space, is processed in the mono image data processing operation comprised of operations S714 through S718.

A color matching process on the color image data (that is, the C, M and Y signals) is performed in operation S708.

The dithering functions to be applied to the color image data (that is, the C, M and Y signals) are selected in operation S710. The dithering functions are stored in a color dithering function memory. The dithering functions are selected on the basis of a pixel position on a photoconductive drum, that is, the distance from the center of the photoconductive drum. In this description of an embodiment of the present invention, one dithering function is selected for and applied to the C, M and Y signals. However, it will be understood that different dithering functions can be applied to the respective CMY signals.

The color image data (that is, the C, M and Y signals) is then halftone-processed with screening and dithering using the selected dithering functions in operation S712, and is output to the pulse width modulator 406.

In the mono image data processing operation, gamma correction to correct linearity on the black image data K is performed in operation S714.

The dithering functions to be applied to the black image data K are selected in operation S716. The dithering functions are stored in a black and white dithering function memory. The dithering functions here are also selected on the basis of a pixel position on a photoconductive drum, that is, the distance from the center of the photoconductive drum.

The black image data is then halftone-processed with the screening and the dithering in operation S718, and is output to the pulse width modulator 406.

In this description of an embodiment of the present invention, different dithering functions are applied to the color signals and the black and white signal. However, the same dithering function can be applied to both the color signals and the black and white signal. That is, one of dithering functions is selected according to the distance from the center of the photoconductive drum, and the selected dithering function can be applied to the color signals and the black and white signal.

Figures 8, 9A, 9B:
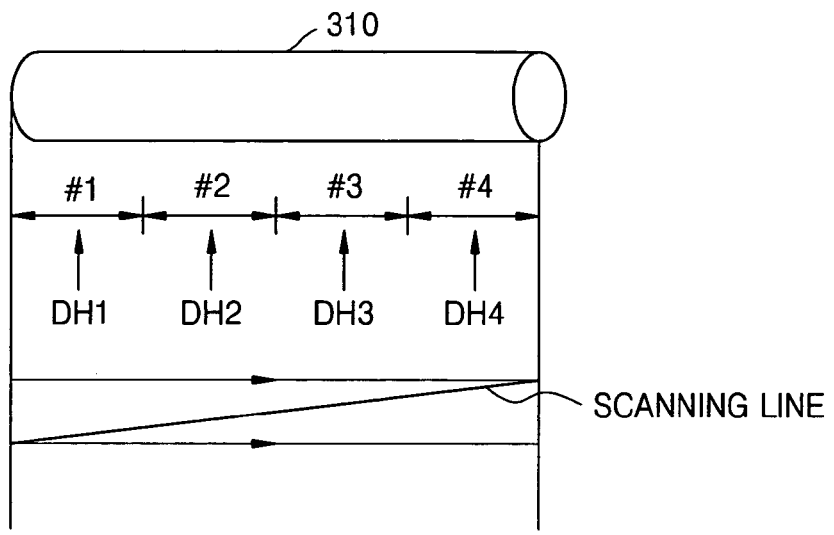
FIG. 8 is a conceptual diagram of a halftone processing method according to an embodiment of the present invention.
FIGS. 9A and 9B are examples of the dithering functions used in a halftone processing method according to an embodiment of the present invention.

FIG. 8 is a conceptual diagram of a halftone processing method according to an embodiment of the present invention. Referring to FIG. 8, the surface of a photoconductive drum 310 is divided into four regions #1 through #4 along the length of the photoconductive drum, and different dithering functions DH1 through DH4 are applied to the respective regions. The dithering function for each is selected according to the position where each pixel is scanned on the photoconductive drum. A considerable correction effect can be obtained by applying one dithering function to the first and fourth regions #1 and #4 that are the edges of the photoconductive drum, and applying another dithering function to the other regions #2 and #3 in accordance with an embodiment of the present invention.

FIGS. 9A and 9B are examples of the dithering functions used in a halftone processing method according to an embodiment of the present invention.

The dithering functions 902 and 904 shown in FIG. 9A are examples of distribution type functions, and the dithering functions 906 and 908 shown in FIG. 9B are examples of concentration type functions. In the FIGS. 9A and 9B, the dithering functions 902 and 906 on the left are applied to the center of a photoconductive drum, and the dithering functions 904 and 908 on the right are applied to the edges of the photoconductive drum.

The difference between the dithering functions 902 and 906 on the left, and the dithering functions 904 and 908 on the right, is that the critical values are different. That is, the critical value of the dithering functions 902 and 906 on the left is 1, and the critical value of the dithering functions 904 and 908 on the right is 2.

Since the critical value of the dithering function 904 on the right is larger than the critical value of the dithering function 902 on the left, the intensity of a laser beam on the edges of the photoconductive drum is increased. Specifically, when it is assumed that a level "255" of black and white image data indicates the color white, and a level "0" indicates the color black, black is printed only when the pixel value at the top left position is larger than 1, that is, when the pixel is relatively close to black, in the case of the dithering function 902. The black color is printed even when the pixel value at the top left position is larger than 2, that is, even when the pixel is less close to black, in the case of the dithering function 904. Therefore, when the dithering functions 904 and 908 shown on the right of FIGS. 9A and 9B are applied to the edges of the photoconductive drum, the intensity of the laser beam is increased at the edges as compared with the center.

Figure 10:
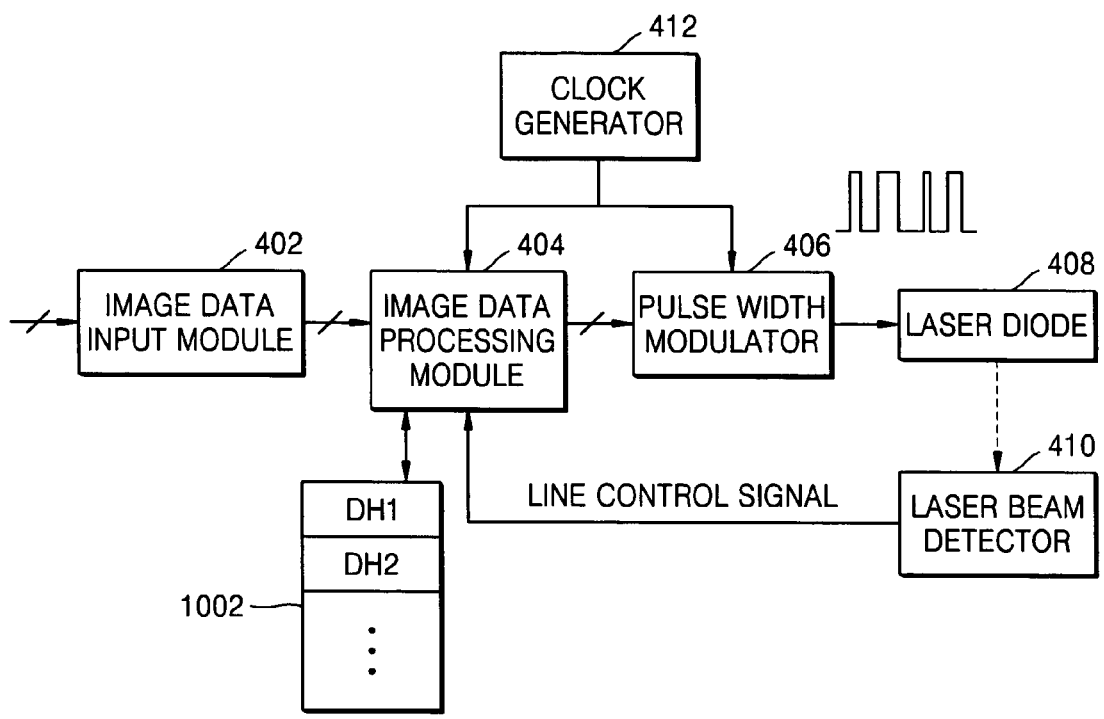
FIG. 10 is a block diagram of a circuit of a laser printer including a halftone processing apparatus according to an embodiment of the present invention.

FIG. 10 is a block diagram of a circuit of a laser printer including a halftone processing apparatus according to an embodiment of the present invention.

In the apparatus shown in FIG. 10, elements common to FIG. 4 are referred to by the same reference numbers, and their detailed description will not be repeated.

Unlike the apparatus shown in FIG. 4, the apparatus shown in FIG. 10 further has a dithering function memory 1002. The dithering function memory 1002 stores a plurality of different dithering functions to be applied according to scanning positions on a photoconductive drum.

The image data processing module 404 selects and uses one of the dithering functions stored in the dithering function memory 1002. The selection of the dithering function to be applied depends on the position of a pixel, that is, the position where the pixel is scanned on the photoconductive drum. The image data processing module 404 operates in synchronization with the laser beam detector 410 to calculate the position where the pixel is scanned on the photoconductive drum by checking the time when a laser beam is detected by the laser beam detector 410, that is, the time lapse at the edges of the photoconductive drum, and then selects the dithering function with reference to the calculated distance.

As described above, a halftone processing method in a laser printer according to embodiments of the present invention improves print quality by increasing light intensity at the edges of a photoconductive drum by permitting the laser printer to be halftone-processed using dithering functions, whose critical values are different for the center and the edges of the photoconductive drum.

While this invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A halftone processing method of improving print quality by correcting the variation in the intensity of a beam generated on a photoconductive drum in a laser printer, the method comprising the steps of:
   preparing a plurality of dithering functions;
   detecting a position where image data for forming an electrostatic latent image is scanned on the photoconductive drum;
   selecting one of the plurality of dithering functions according to the detected scanning position; and
   halftone-processing the image data using the selected dithering function.

2. The method of claim 1, wherein the plurality of dithering functions comprise different critical values.

3. A halftone processing apparatus for correcting the variation in the intensity of a beam generated on a photoconductive drum in a laser printer, the apparatus comprising:
   a dithering function memory which is configured to store a plurality of dithering functions; and
   an image data processing unit which is configured to select one of the plurality of dithering functions stored in the dithering function memory according to a position where image data for forming an electrostatic latent image is scanned on the photoconductive drum, and for performing a halftone process for image data to be printed from the laser printer using the selected dithering function.

4. The apparatus of claim 3, wherein the plurality of dithering functions stored in the dithering function memory comprise different critical values.

5. A halftone processing method of improving print quality by correcting the variation in the intensity of a beam generated on a photoconductive drum in a laser printer, the method comprising the steps of:
   determining whether input image data is color image data and performing a mono image data processing operation using dithering functions having different critical values if the input image data is not color image data; and
   performing a color video processing operation using dithering functions having different critical values if the input image data is color image data,
   wherein the critical values of the dithering functions are selected such that an intensity of the laser beam can be varied over a length of the photoconductive drum.

6. The method of claim 5 wherein the mono image data processing operation comprises the steps of:
   performing a gamma correction to correct linearity on black image data K;
   selecting the dithering functions to be applied to the black image data K, wherein the dithering functions are stored in a black and white dithering function memory, based on a pixel position on a photoconductive drum; and
   performing a halftone-process on the black image data using the selected dithering function.

7. The method of claim 6 wherein, the pixel position is defined as the distance from the center of the photoconductive drum.

8. The method of claim 5 wherein the color video processing operation comprises the steps of:
   color-converting the color image data;
   performing at least one of a gray component reduction (GCR) and an under color removal (UCR) process on the converted color image data;
   extracting a black video signal K to be processed in the mono image data processing operation;
   performing a color matching process on the color image data;
   selecting the dithering functions to be applied to the color image data based on a pixel position on a photoconductive drum; and
   performing a halftone-process on the color image data using the selected dithering function.

9. The method of claim 8 wherein, the pixel position is defined as the distance from the center of the photoconductive drum.

10. The method of claim 5 wherein the critical values of the dithering functions are selected such that an intensity of the laser beam on the edges of the photoconductive drum is increased.

* * * * *